United States Patent [19]
Sanders et al.

[11] Patent Number: 6,046,810
[45] Date of Patent: Apr. 4, 2000

[54] KERR EFFECT COMPENSATOR FOR A FIBER OPTIC GYROSCOPE

[75] Inventors: Glen A. Sanders; James N. Blake, both of Scottsdale; Ralph A. Bergh, Phoenix, all of Ariz.

[73] Assignee: Honeywell Inc., Minneapolis, Minn.

[21] Appl. No.: 09/224,587

[22] Filed: Dec. 31, 1998

[51] Int. Cl.[7] ................................................ G01C 19/72
[52] U.S. Cl. .......................................................... 356/350
[58] Field of Search ................................... 356/350, 345; 385/12

[56] References Cited

U.S. PATENT DOCUMENTS

| | | |
|---|---|---|
| 4,673,293 | 6/1987 | Sanders . |
| 5,465,149 | 11/1995 | Strandjord et al. . |
| 5,473,480 | 12/1995 | Kemmler ............................ 356/350 |
| 5,563,705 | 10/1996 | Sanders .............................. 356/350 |

Primary Examiner—Samuel A. Turner
Attorney, Agent, or Firm—Albert K. Kau

[57] ABSTRACT

An interferometric fiber optic gyroscope having compensation electronics to virtually eliminate rotation rate sensing errors caused by Kerr effect in the IFOG due to differing intensities of the counter-propagating beams relative to each other. Compensation accounts for varying intensities of the beams due to all or some changes of: the light beam splitter ratio relative to temperature; fiber coil loss due to temperature and longevity; and the intensity of the light source because of age.

49 Claims, 8 Drawing Sheets

MODULATED PHOEODETECTOR OUTPUT

SAMPLED SYSTEM
$A_i, B_i$ ARE DIGITAL NUMBERS $$\sum_i (A_i - B_i) = CONST \cdot \Omega$$

KERR EFFECT COMPENSATOR FOR A FIBER OPTIC GYROSCOPE

BACKGROUND OF THE INVENTION

The present invention concerns fiber optic systems having Kerr effect reduction schemes and, more particularly, compensating arrangements for reducing Kerr effect errors.

Fiber optic gyroscopes are an attractive means with which to sense rotation of an object supporting such a gyroscope. Such gyroscopes can be made quite small and can be constructed to withstand considerable mechanical shock, temperature change, and other environmental extremes. Due to the absence of moving parts, they can be nearly maintenance free, and they have the potential of becoming economical in cost. They can also be sensitive to very low rotation rates that can be a problem in other kinds of optical gyroscopes.

A fiber optic gyroscope has a coiled optical fiber wound on a core and about the axis thereof around which rotation is to be sensed. The optical fiber is typical of a length of 100 to 2,000 meters, or so, and is part of a closed optical path in which an electromagnetic wave, or light wave, is introduced and split into a pair of such waves to propagate in opposite directions through the coil to both ultimately impinge on a photo detector. This optical arrangement is referred to as the Sagnac interferometer. Rotation about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e., the well-known Sagnac effect. This gyroscope is known as the interferometric fiber optic gyro (IFOG). The use of a coiled optical fiber is desirable because the amount of phase difference shift due to rotation, and so the output signal, depends on the length of the entire optical path through the coil traversed by the two electromagnetic waves traveling in opposed direction, and so a large phase difference can be obtained in the long optical fiber but in the relatively small volume taken by it as a result of being coiled.

The output current from the photo detector system photodiode, in response to the opposite direction traveling electromagnetic waves impinging thereon after passing through the coiled optical fiber, follows a raised cosine function. That is, the output current depends on the cosine of the phase difference between these two waves. Since a cosine function is an even function, such an output function gives no indication as to the relative directions of the phase difference shift, and so no indication as to the direction of the rotation about the coil axis. In addition, the rate of change of a cosine function near zero phase is very small, and so such an output function provides very low sensitivity for low rotation rates.

Because of these unsatisfactory characteristics, the phase difference between the two opposite direction traveling electromagnetic waves is usually modulated by placing an optical phase modulator, or what is sometimes referred to as a bias modulator, in the optical path on one side of the coiled optical fiber. In order to achieve sensitive detection of rotation, the Sagnac interferometer is sometimes biased by a sinusoidal modulation of the differential phase between the counter-propagating beams within the interferometric loop. As a result, one of these opposite-direction-propagating waves passes through the modulator on the way into the coil while the other wave, traversing the coil in the opposite direction, passes through the modulator upon exiting the coil.

In addition, a phase-sensitive detector serving as part of a demodulator system is provided to receive a signal representing the photo detector output current. Both the phase modulator and the phase-sensitive detector can be operated by a sinusoidal signal generator at the so-called "proper" frequency to reduce or eliminate modulator induced amplitude modulation, but other waveform types of the same fundamental frequency can be used. Other frequencies can be used, and often are, to reduce the frequency to a more manageable value.

The resulting signal output of the phase-sensitive detector follows a sine function, i.e., the output signal depends on the sine of the phase difference between the two electromagnetic waves impinging on the photodiode, primarily the phase shift due to rotation about the axis of the coil in the absence of occurrence of other significant but unwanted phase shifts. A sine function is an odd function having its maximum rate of change at zero phase shift, and so changes algebraic sine on either side of zero phase shift. Hence, the phase-sensitive detector signal can provide an indication of which direction a rotation is occurring about the axis of the coil, and can provide the maximum rate of change of signal value as a function of the rotation rate near a zero rotation rate, i.e., the detector has its maximum sensitivity for phase shifts near zero so that its output signal is quite sensitive to low rotation rates. This is possible, of course, only if phase shifts due to other sources, that is, errors, are sufficiently small. In addition, this output signal in these circumstances is very close to being linear at relatively low rotation rates. Such characteristics for the output signal of the phase-sensitive detector are a substantial improvement over the characteristics of the output current of the photo detector without optical phase modulation.

The Sagnac interferometer may also be used to sense any non-reciprocal phase shift in the propagation of light. Perhaps the most useful of these, besides rotation sensing, is sensing of electric current that is crossing the inside of the plane of the fiber sensing coil. In this case, if the fiber coil contains two counter-propagating light waves of a circular polarization state, the magnetic field generated by the electric current will induce a phase difference between counter-propagating waves. This phase difference is proportional to the electric current magnitude and the polarity of the phase difference is an indication of the direction of the electric current flow. One reference containing further details of the Sagnac interferometer current sensor and other optical fiber current sensors is U.S. Pat. No. 5,644,387, issued Jul. 1, 1997 to inventor James N. Blake, and entitled "Fiber Optic Interferometric Circuit and Magnet Field Sensor", which is incorporated herein as a reference. The appearance of a non-reciprocal phase shift due to electric current as given by the photo-detector, is similar to that caused by rotation rate. Therefore, many of the approaches disclosed in this invention can also be applied to electric current sensing. One form of electric current that can be sensed is an alternating current, $I_{ac}$ across a capacitor of capacitance, C, caused by an alternating voltage, V. This current is referred to as the displacement current given by $$I_{ac} = -C\frac{dV}{dt}$$

By directly measuring the displacement current, an indirect measurement of the alternating voltage can be made. The sensing of voltage by the above approach of sensing current or displacement current is still referred to as current sensing throughout this invention application since the fundamental measurand that is being measured is still electric current. The following discussion centers around the details of the fiber optic gyroscope; however, many of the principles of the invention disclosed also relate to electric current sensing in the Sagnac interferometer. The Sagnac interferometer employs two spatially separated beams of light traveling around a closed path in opposite directions. The phases of these beams are later compared by recombining and interfering them.

An example of a fiber optic gyroscope from the prior art is shown in FIG. 1. The optical portion of the system contains several features along the optical paths to assure that this system is reciprocal, i.e., that substantially identical optical paths occur for each of the opposite direction propagating electromagnetic waves except for the specific introductions of non-reciprocal phase difference shifts, as will be described below. The coiled optical fiber forms a coil 10 about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

In addition, the optical fiber in the fiber optic gyroscope can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, either the high refractive index axis, i.e., the slower propagation axis, or the low index axis is chosen for propagating the electromagnetic waves depending on the other optical components in the system.

The electromagnetic waves that propagate in opposite directions through coil 10 are provided from an electromagnetic wave source, or light source 11, in FIG. 1. This source is typically a semiconductor light source such as a laser diode, which provides electromagnetic waves, typically in the near-infrared part of the spectrum, with typical wavelengths from 830 nanometers (nm) to 1550 nm. Source 11 must have a short coherence length for emitted light to reduce the phase shift difference errors between these waves due to Rayleigh and Fresnel scattering at scattering sites in coil 10. Because of the nonlinear Kerr effect in coil 10, different intensities in the two counter propagating waves can lead to different phase shifts therebetween. This situation can be overcome also by use of a short coherence length source for source 11 that emits light with suitable statistical properties.

Between laser diode 11 and fiber optic coil 10 there is shown an optical path arrangement in FIG. 1 formed by the extension of the ends of the optical fiber forming coil 10 to some optical coupling components which separate the overall optical path into several optical path portions. A portion of optical fiber is positioned against laser diode 11 at a point of optimum light emission therefrom, a point from which it extends to a first optical directional coupler 12.

Optical directional coupler 12 has light transmission media therein which extend between four ports, two on each end of that media, and which are shown on each end of coupler 12 in FIG. 1. One of these ports has the optical fiber extending from laser diode 11 positioned thereagainst. At the other port on the sense end of the optical directional coupler 12 there is shown a further optical fiber positioned thereagainst which extends to be positioned against a photodiode 13 which is electrically connected to a photo-detection system 14.

Photodiode 13 detects electromagnetic waves, or light waves, impinging thereon from the portion of the optical fiber positioned thereagainst and provides a photo current in response to a signal component selection means 35. This photo current, as indicated above, in the case of two nearly coherent light waves impinging thereon, follows a cosine function in providing a photo current output which depends on the cosine of the phase difference between such a pair of substantially coherent light wavers. This photovoltaic device will operate into a very low impedance to provide the photocurrent that is a linear function of the impinging radiation, and may typically be a p-i-n photodiode.

Optical directional coupler 12 has another optical fiber against a port at the other end thereof which extends to a polarizer 15. At the other port on that same side of coupler 12 there is a non-reflective termination arrangement 16, involving another portion of an optical fiber.

Optical directional coupler 12, in receiving electromagnetic waves, or light, at any port thereof, transmits such light so that approximately half thereof appears at each of the two ports of coupler 12 on the end there of opposite that end having the incoming port. On the other hand, no such waves or light is transmitted to the port that is on the same end of coupler 12 as is the incoming light port.

Polarizer 15 is used because, even in a single spatial mode fiber, light can propagate in two polarization modes through the fiber. Thus, polarizer 15 is provided for the purpose of passing light propagating of one polarization such that clockwise (cw) and counterclockwise (ccw) waves of the same polarization are introduced into the sensing loop and only light from the sensing loop of the same polarization for the cw and ccw waves are interfered at the detector. Polarizer 15, however, does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which the polarizer is placed. In this regard, the high birefringence in the optical fiber used again aids in reducing this resulting phase difference, as indicated above.

Polarizer 15 has a port on either end thereof with the electromagnetic wave transmission medium contained therein positioned therebetween. Positioned against the port on the end thereof opposite that connected to optical directional coupler 12 is another optical fiber portion which extends to a further optical bi-directional coupler 17 which has the same wave transmission properties as does coupler 12.

The port on the same end of coupler 17 from which a port is coupled to polarizer 15 again is connected to a non-reflective termination arrangement 18, using a further optical fiber portion. Considering the ports on the other end of coupler 17, one is connected to further optical components in the optical path portions extending thereto from one end of the optical fiber in coil 10. The other port in coupler 17 is directly coupled to the remaining end of optical fiber coil 10. Between coil 10 and coupler 17, on the side of coil 10 opposite the directly connected side thereof, is provided an optical phase modulator 19. Optical phase modulator 19 has two ports on either end of the transmission media contained therein shown on the opposite ends thereof in FIG. 1. The optical fiber from coil 10 is positioned against a port of modulator 19. The optical fiber extending from coupler 17 is positioned against the other port of modulator 19.

Optical modulator 19 is capable of receiving electrical signals to cause it to introduce a phase difference in electromagnetic waves transmitted therethrough by changing the index of refraction of the transmission medium, or transmission media, therein to thereby change the optical path length. Such electrical signals are supplied to modulator 19 by a bias modulation signal generator 20 providing a sinusoidal voltage output signal at a modulation frequency $f_g$ that is intended to be equal to $C_1 \sin(\omega_g t)$ where $\omega_g$ is the radian frequency equivalent of the modulation frequency $f_g$. Other suitable periodic waveforms could alternatively be used.

The above completes the description of the optical portion of the system of FIG. 1 formed along the optical path followed by the electromagnetic waves, or light waves, emitted by source 11. Such electromagnetic waves are coupled from that source through the optical fiber portion to optical directional coupler 12. Some of such wave entering coupler 12 from source 11 is lost in non-reflecting terminating arrangement 16 coupled to a port on the opposite end thereof, but the rest of that wave is transmitted through polarizer 15 to optical directional coupler 17.

Coupler 17 serves as a beam-splitting apparatus in which electromagnetic waves entering the port thereof, received from polarizer 15, split approximately in half with one portion thereof passing out of each of the two ports on the opposite ends thereof. Out of one port on the opposite end of coupler 17 an electromagnetic wave passes through optical fiber coil 10, modulator 19, and back to coupler 17. There, a portion of this returning wave is lost in non-reflective arrangement 18 connected to the other port on the polarizer 15 connection end of coupler 17, but the rest of that wave passes through the other port of coupler 17 to polarizer 15 and to coupler 12 where a portion of it is transmitted to photodiode 13. The other part of the wave passed from polarizer 15 to coil 10 leaves the other port on the coil 10 end of coupler 17, passes through modulator 19, and optical fiber coil 10 to re-enter coupler 17 and, again, with a portion thereof following the same path as the other portion to finally impinge on photodiode 13.

As indicated above, photodiode 13 provides an output photocurrent $i_{PD13}$ proportional to the intensity of the two electromagnetic waves or light waves impinging thereon, and is therefore expected to follow the cosine of the phase difference between these two waves impinging on that diode as given by the following equation:

$$i_{PD_{13}} = \frac{I_0}{2}[1 + \cos(\varphi_R + \varphi_m \cdot \cos\omega_g t)]$$

This is because the current depends on the resulting optical intensity of the two substantially coherent waves incident on photodiode 13, an intensity which will vary from a peak value of $I_O$ to a smaller value depending on how much constructive or destructive interference occurs between the two waves. This interference of waves will change with rotation of the coiled optical fiber forming coil 10 about its axis as such rotation introduces a phase difference shift of $\phi_R$ between the waves. Further, there is an additional variable phase shift introduced in this photodiode output current by modulator 19 with an amplitude value of $\phi_m$ and which is intended to vary as $\cos(\omega_g t)$. Optical phase modulator 19 is of the kind described above and is used in conjunction with a phase-sensitive detector as part of a demodulation system for converting the output signal of photo-detection system 14, following a cosine function as indicated above, to a signal following a sine function. Following such a sine function provides in that output signal, as indicated above, information both as to the rate of rotation and the direction of that rotation about the axis of coil 10.

Thus, the output signal from photo-detection system 14, including photodiode 13, is converted to a voltage and provided through an amplifier 21, where it is amplified and passed through a filter 22, to such a phase sensitive detector means 23. Photo-detection system 14, amplifier 21, filter 22 and phase sensitive detector 23 constitute signal component selection means 35. Phase-sensitive detector 23, serving as part of a phase demodulation system, is a known device. Such a phase-sensitive detector extracts the amplitude of the first harmonic of the filtered photodiode system output signal, or the fundamental frequency of modulation signal generator 20, to provide an indication of the relative phase of the electromagnetic waves impinging on photodiode 13. This information is provided by phase-sensitive detector 23 in an output signal following a sine function, that is, this output signal follows the sine of the phase difference between the two electromagnetic waves impinging on photodiode 13. The output of phase sensitive detector 23 goes to rotation indicator or rotation rate indicator 26.

Bias modulator signal generator 20, in modulating the light in the optical path at the frequency $f_g$ described above, also leads to harmonic components being generated by the recombined electromagnetic waves in photo-detection system 14. Filter 22 is a band-pass filter, which is to pass the modulation frequency component of the output signal of photo detector 14, i.e., the first harmonic, after its amplification by amplifier 21.

In operation, the phase difference changes in the two opposite direction propagating electromagnetic waves passing through coil 10 in the optical path, because of rotation, will vary relatively slowly compared with the phase difference changes due to modulator 19. Any phase differences due to rotation, or the Sagnac effect, will merely shift the phase differences between the two electromagnetic waves. The amplitude scaling factor of the modulation frequency component of the output signal of photo-detection system 14, appearing at the output of filter 22, is expected to be set by the sine of this phase difference modified further only by the factors of the amplitude value of the phase modulation of these waves due to modulator 19 and generator 20, and a constant representing the various gains through the system. Then, the periodic effects of this sinusoidal modulation due to generator 20 and modulator 19 in this signal component are expected to be removed by demodulation in the system containing phase-sensitive detector 23 leaving a demodulator system (detector) output signal depending on just the amplitude scaling factor thereof.

Thus, the voltage at the output of amplifier 21 will typically appear as:

$$V_{21-out} = k\{1 + \cos[\phi_R + \phi_m \cos(\omega_g t + \theta)]\}$$

The constant k represents the gains through the system to the output of amplifier 21. The symbol $\theta$ represents additional phase delay in the output signal of amplifier 21 with respect to the phase of the signal provided by generator 20. Some of this phase shift will be introduced in photo-detection system 14, and some will be due from other sources such as a phase shift across modulator 19 between the phase of the signals supplied by generator 20 and the response of modulator 19 in having the index of refraction of the media therein, and/or its length, correspondingly change. The other symbols used in the preceding equation have the same meaning as they did in the first equation above.

The foregoing equation can be expanded in a Bessel series expansion to give the following:

$$V_{21\text{-}out} = k[1 + J_0(\varphi_m)\cos\varphi_R] -$$

$$2kJ_1(\varphi_m)\sin\varphi_R\cos(\omega_g t + \theta) -$$

$$2kJ_2(\varphi_m)\cos\varphi_R\cos 2(\omega_g t + \theta) +$$

$$2kJ_3(\varphi_m)\sin\varphi_R\cos 3(\omega_g t + \theta) +$$

$$\sum_{n=2}^{\infty}[(-1)^n 2kJ_{2n}(\varphi_m)\cos\varphi_R\cos 2n(\omega t + \theta) +$$

$$(-1)^n 2kJ_{2n+1}(\varphi_m)\sin\varphi_R\cos(2n+1)(\omega_g t + \theta)]$$

This signal at the output of amplifier 21 is applied to the input of filter 22.

Filter 22, as indicated above, passes primarily the first harmonic from the last equation, i.e., the modulation frequency component. As a result, the output signal of filter 22 can be written as follows:

$$V_{22\text{-}out} = -2kJ_1(\phi_m)\sin\phi_R\cos(\omega_g t + \theta + \psi_1)$$

The further phase delay term appearing $\psi_1$ is the additional phase shift in the first harmonic term added as a result of passing through filter 22. This added phase shift is expected to be substantially constant and a known characteristic of filter 22.

The signal from filter 22 is then applied to phase-sensitive detector 23, as is the signal from bias modulator generator 20, the latter again intended to be equal to $C_1\sin(\omega_g t)$ where $\omega_g$ is the radian frequency equivalent of the modulation frequency $f_g$. Assuming that a phase shift equal to $\theta + \psi_1$ can be added by phase-sensitive detector 23 to its reference signal, the output of that detector with such a generator 20 output signal will then be the following:

$$V_{23\text{-}out} = k'J_1(\phi_m)\sin\phi_R$$

The constant k' accounts for the system gains through phase-sensitive detector 23.

As can be seen from this equation, the output of phase sensitive detector 23 depends on the amplitude $\phi_m$ supplied by bias modulator 19 as operated by bias modulation generator 20 can be used to set the value of the signal at the output of phase-sensitive detector 23 for a given rotation rate of coil 10 about its axis, i.e., set the scale factor for the gyroscope at least within a range of possible values therefor.

However, these expected results may not be achieved in the system of FIG. 1. One reason for failing to achieve the expected results is that bias modulation signal generator 20, in modulating the light in the optical path at frequency $f_g$ as described above through phase modulator 19, not only results in harmonic components being generated in photo-detection system 14 by the recombined electromagnetic waves, but also directly supplies some harmonic components in the varying optical path phase because of nonlinearities occurring both in generator 20 and modulator 19.

That is, as a first possibility, the output signal supplied by modulation generator 20 at its output may contain not only a fundamental signal at frequency $f_g$, but also significant harmonics thereof. Even if a signal free of such harmonics could be provided, nonlinear component characteristics and hysteresis in phase modulator 19 can result in introducing such harmonics into the varying phase provided thereby in the optical path. Such harmonics can lead to significant rate bias errors in the output signal of the fiber optic gyroscope. Thus, there is desired an interferometric fiber optic gyroscope in which such errors due to the modulation system are reduced or eliminated.

The "proper" frequency is selected to be that frequency which results in the modulating cf one of the waves 180 degrees out of phase with the modulation of the other. This modulation providing 180 degrees of phase difference between the two waves has the effect of eliminating modulator induced amplitude modulation of the resulting photo detector signal. The value of the "proper" frequency can be determined from the length of the optical fiber and the equivalent refractive index therefor.

The resulting signal output of the phase sensitive demodulator follows a sine function, i.e., the output signal depends on the sine of the phase difference between the two electromagnetic waves impinging on the photodiode, primarily the phase shift due to rotation about the axis of the coil. A sine function is an odd function having its maximum rate of change at zero, and so changes algebraic sign on either side of zero. Hence, the phase sensitive demodulator signal can provide both an indication of which direction a rotation is occurring about the axis of the coil, and can provide the maximum rate of change of signal value as a function of rotation rate near a zero rotation rate, i.e., has its maximum sensitivity near zero phase shifts, so that its output signal is quite sensitive to low rotation rates. This is possible, of course, only if phase shifts due to other sources, that is, errors, are made sufficiently small. In addition, this output signal in these circumstances is very close to being linear at relatively low rotation rates. Such characteristics for the output signal of the phase sensitive demodulator are a substantial improvement over the characteristics of the output current of the photo detector.

Nevertheless, the phase sensitive demodulator output, in following a sine function, results in an output that at rotation rates further from zero, is less and less linear. For rotation rates of an amplitude sufficient to be past one of the peaks of the sine function, the output response value because of being periodic will be ambiguous with respect to just which rotation rate is occurring. Thus, there is a strong desire to operate the gyroscope so that the output signal of the phase sensitive demodulator stays within the linear region near the zero rotation rate value. This can be accomplished by adding a further phase modulator, or frequency shifter, near the coil in an optical path portion used by the opposite direction traveling electromagnetic waves propagating through the coiled optical fiber to reach the photo detector. This phase modulator, or frequency shifter, is operated in a feedback loop from the photo detector system, and provides sufficient negative feedback such that the phase modulator introduced phase change is just enough to cancel the phase shift difference between the opposite traveling direction electromagnetic waves resulting from a rotation about the axis of the coiled optical fiber. As a result, there will be little phase shift difference occurring at the photo detector except for transient rotation rate changes, and so little phase shift sensed by the phase sensitive demodulator. Thus, the output signal of this phase sensitive demodulator will always be near to, or at, zero. The signal from a generator connected to the phase sensitive demodulator for operating this additional phase modulator, through providing a signal directing the modulator to provide a particular phase shift sufficient to cancel the phase shift due to rotation, will thus contain within it or a related signal the information as to the magnitude and direction of the rotation rate.

Several forms for the output signal from the generator connected to the phase sensitive demodulator in the feedback loop have been suggested for operating this additional optical phase modulator. One common and good choice is to use a serrodyne generator that applies a sawtooth-like signal to the optical phase modulator. A sawtooth or sawtooth-like signal is chosen because it can be shown that an ideal sawtooth signal of $2\pi$ phase amplitude provides what amounts to a pure frequency translation for the modulated electromagnetic waves, a single-sideband modulator. As a result, light passing through the phase modulator being operated with such a sawtooth signal will leave the modulator with its frequency translated by an amount equal to the frequency of the sawtooth signal. A non-ideal sawtooth signal won't result in pure frequency translation, there instead will be added harmonics generated which can be kept small by providing very nearly a sawtooth waveform and by good design of the modulator.

Since the optical phase modulator so operated will be on one side of the coiled optical fiber, one of the electromagnetic waves will have its frequency translated upon entering the coil while the other will not have its frequency translated until it exits the coil. Hence, one wave traverses the loop having a higher frequency than the other (though both have the same frequency on reaching the photo detector) with the result that, for a fixed modulator (or serrodyne generator) frequency, one will have a phase shift with respect to the other at the photo detector in an amount set by the frequency of the sawtooth and the nature of the fiber of $2\pi\tau\Delta f$. Here, $\Delta f$ is the modulator or generator frequency, and $\tau$ is the transit time of the light waves through the coil. This phase shift will act to counter the phase shift between the light waves, caused by rotation, because of the negative feedback loop in which the modulator is provided. Thus, the frequency of the sawtooth, or sawtooth-like generator output signal will be an indication of the rotation rate, and the polarity of the sawtooth will indicate the direction of rotation. This is a closed loop configuration.

The closed loop IFOG is shown in FIG. 2. Rather than to the rotation rate indicator 26 of FIG. 1, the signal from phase sensitive detector 23 goes to servo electronics 24 of FIG. 2. This signal indicates the magnitude and sign of the phase difference between beams. In response to such phase difference, servo electronics 24 outputs a phase ramp signal 25 that goes to summing amplifier 27 that supplies the phase ramp to modulator 19 in the form of signal 28 to phase-shift one beam. Relative to the other beam so as to bring the beams in phase with each other. Summing amplifier 27 also supplies in signal 28 the bias modulation signal to this phase modulator. The feedback signal required to return beams into phase, such as the frequency of the sawtooth in the serrodyne modulation case, is an indication of the rate of rotation of sensing loop. In this closed loop case the modulator of choice is typically a phase modulator on an integrated optic chip (IOC.) In order to accommodate the necessary high frequency content of the desired phase ramp signal which may be a sawtooth or a dual-ramp-type triangular wave. Signal 25, indicative of rotation, is then supplied to rotation rate indicator 26 of FIG. 2, which provides a convenient and readily useful indication of rotation rate of loop 10.

SUMMARY OF THE INVENTION

The invention is a solution to the problem of unequal intensities of counter-propagating beams in the sensing loop of a fiber optic gyroscope, which cause a Kerr effect that leads to erroneous rotation rate indications. Equal intensities of these counter-propagating beams virtually eliminate the root cause of the Kerr effect error in the fiber optic gyroscope. Intensity equalization is technically complicated and costly. However, the invention incorporates compensation electronics to virtually eliminate rotation rate sensing errors caused by Kerr effect in the IFOG.

DESCRIPTION OF THE EMBODIMENT

Figure 1:
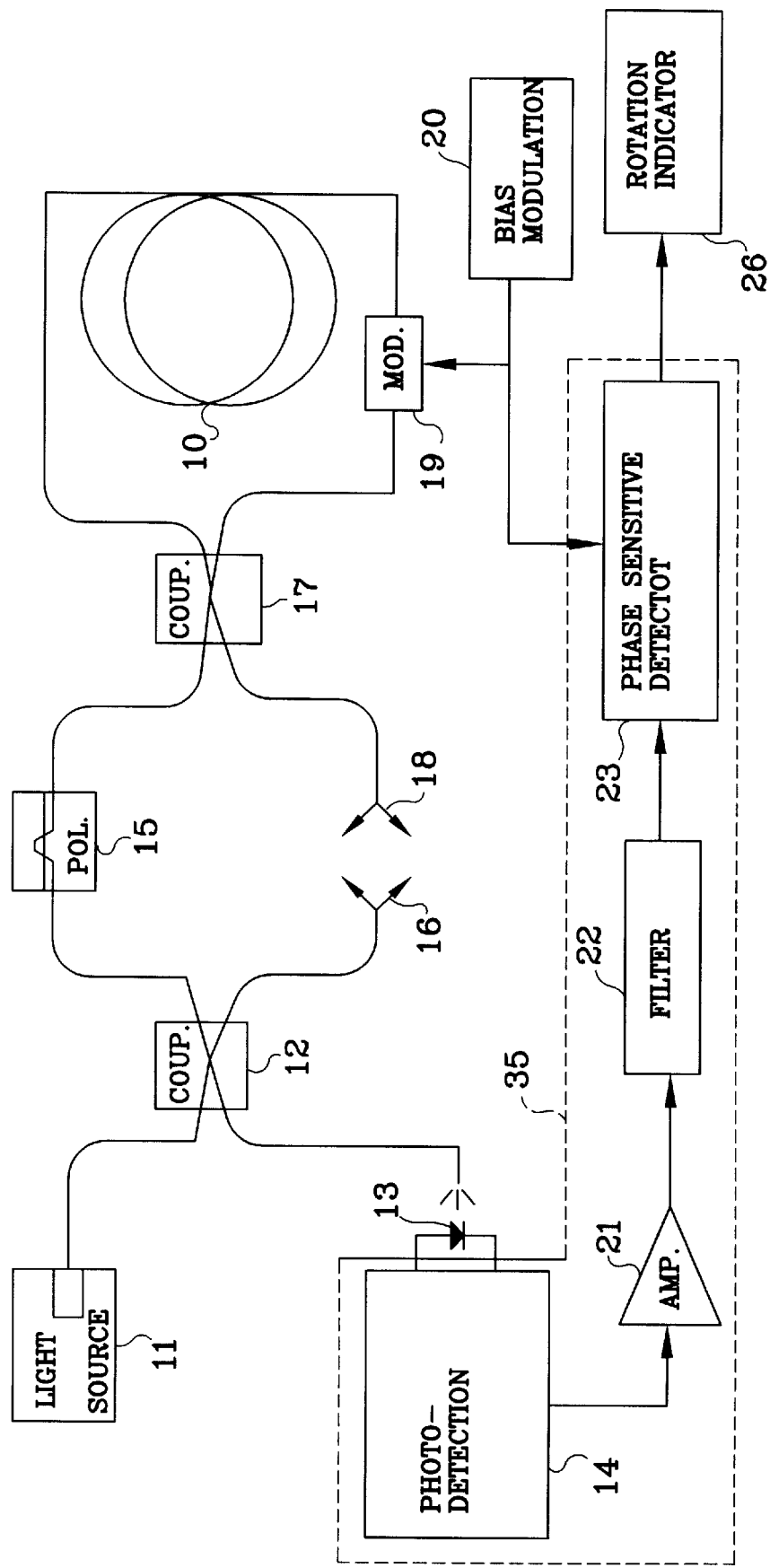
FIG. 1 shows an open loop interferometric fiber optic gyroscope of the related art.
Figure 2:
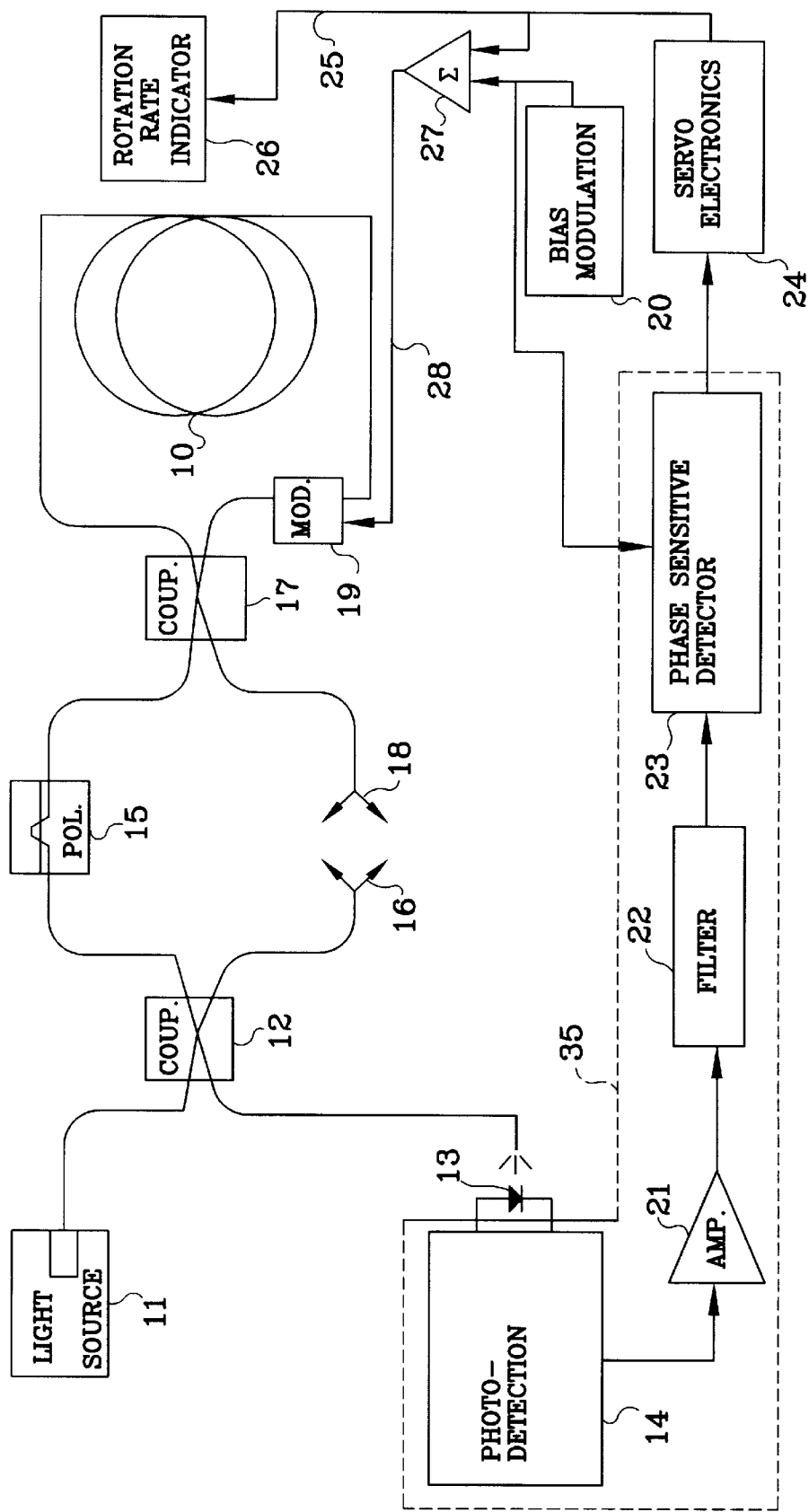
FIG. 2 shows a closed loop interferometer fiber optic gyroscope of the related art.
Figure 3:
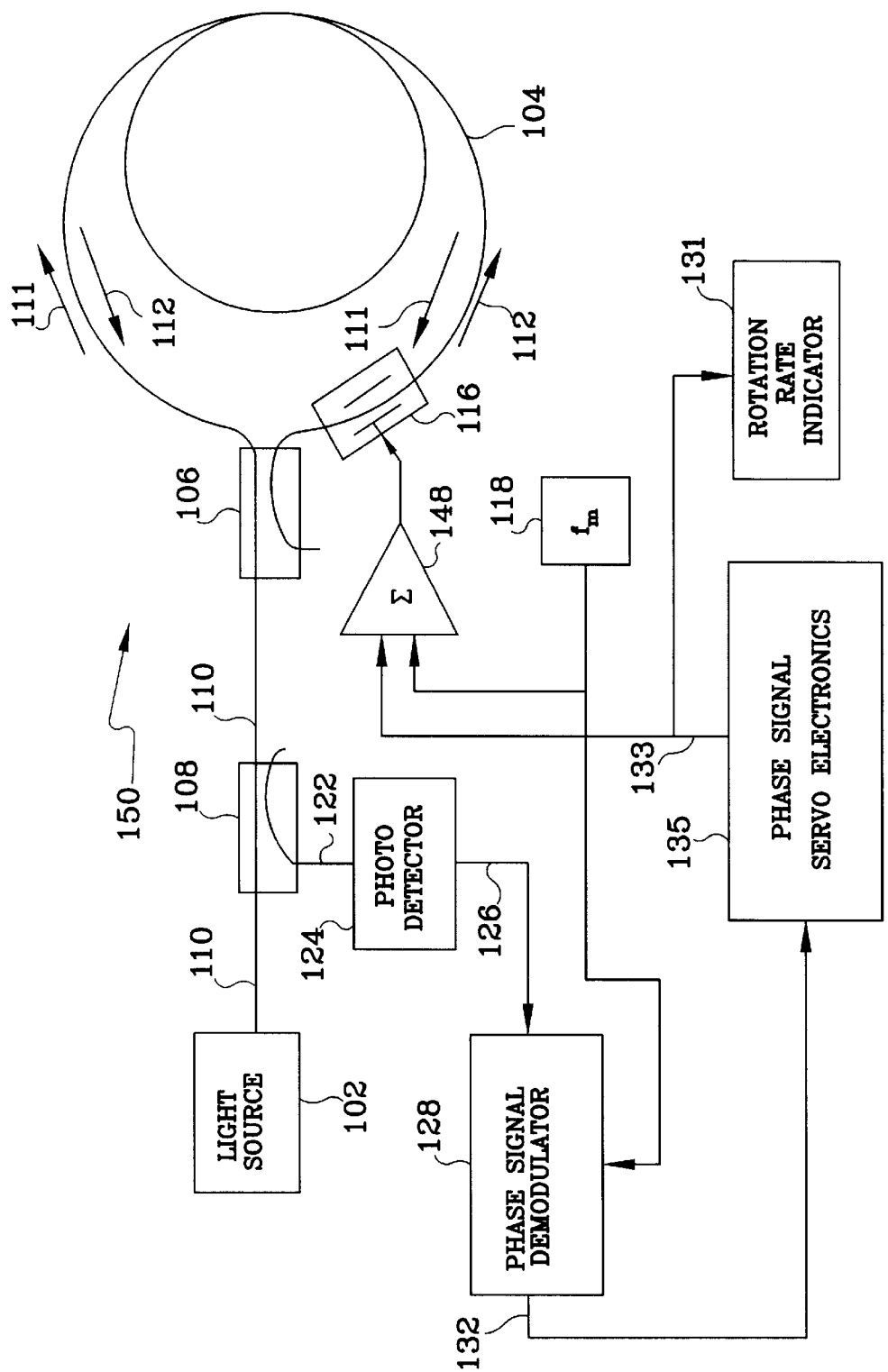
FIG. 3 shows a closed loop interferometer fiber optic gyroscope of the related art.

FIG. 3 reveals an interferometric fiber optic gyroscope 150 of related art to the invention for affecting compensation of optical Kerr effect in sensing loop 104. Light source 102 emits light 110 through splitter 108 and splitter 106, respectively. Light beam 110 is split into two beams 111 and 112 by splitter 106. Splitter 106 is optically connected to the ends of an optical fiber sensing loop 104. Beam 111 propagates clockwise through loop 104 and beam 112 propagates counterclockwise through loop 104.

Phase modulator 116 provides a bias phase modulation to beam 112 as it enters loop 104 and to beam 111 as it exits loop 104. The bias modulation signal originates, via a summing amplifier 148, from oscillator 118 that puts out the signal at a frequency $f_g$.

Note that the optical circuit having splitter 106 and phase modulator 116, may be placed on one single integrated optics chip, with the splitter 103 replaced by a Y-junction.

Beams 111 and 112 have intensities that affect the index of refraction of the optical path in loop 104. If the intensities of counter-propagating beams 111 and 112 are different, then the lengths of their respective optical paths are different, because of the differing indices of refraction, thereby resulting in a relative phase shift between beams 111 and 112 upon their return from loop 104, when loop 104 is at rest. However, the differing path lengths and relative phase shift of beams 111 and 112 indicate a rotation when interpreted in light of the Sagnac effect. This rotation error is due to the optical Kerr effect caused by the uneven intensities of beams 111 and 112. With one approach disclosed in U.S. Pat. No. 5,627,644, such error may be remedied by assuring that the intensities of beams 111 and 112 are equal to each other. U.S. Pat. No. 5,627,644, issued May 6, 1997, entitled "Kerr Effect Compensation by Optical Power Balancing in Interferometric Fiber Optic Gyroscopes", and by Glen A. Sanders, is hereby incorporated by reference in this description.

Beams 111 and 112 return to splitter 106 and are combined. Beams 111 and 112 enter splitter 106 wherein a portion of the beams go to splitter 108 which conveys beams 111 and 112 via fiber 122 to photo detector 124 that converts the light beams into electrical signals 126. If beams 111 and 112 are in phase, they result in a constructive interference that is converted into a maximum type of electrical signal 126 which indicates no rotation of loop 104 relative to an axis of loop 104 which may be identified with a straight line perpendicular to a plane containing loop 104. If loop 104 is rotating about its axis, then a relative phase shift between beams 111 and 112 occurs thereby resulting in less constructive interference because of beams 111 and 112 being no longer in phase with each other. The corresponding signal from photo detector 124 indicates a less maximum type of signal 126 indicating a rate of rotation of loop 104 about its axis. Since beams 111 and 112 are phase modulated by modulator 116, signal 126 has the modulation signal on it and is thus demodulated by demodulator 128 in conjunction with a signal having a frequency $f_g$ from oscillator 118, to result in a signal 132 indicative of rotation. However, signal 126 and signal 132 may indicate a rate of rotation of loop 104, even when loop 104 is at rest, which is caused by the optical Kerr effect. That is, another way that optical paths of beams 111 and 112 may have different lengths is due to different indices of refraction between the optical paths. The beams travel at different speeds through a media having differing indices of refraction. Even though the same fiber is the path for both beams, the index of refraction for each beam is partially dependent on the relative power of both respective beams. If beams 111 and 112 have two different intensity levels, then the medium will in general have a different propagation constant for one wave than for the other wave. The change in the propagation constants due to the Kerr Effect in the cw and ccw directions, $\beta_{K1}$ and $\beta_{K2}$, respectively, are unequal due to unequal cw and ccw intensities $I_1(z,t)$ and $I_2(z,t)$ corresponding to beams 111 and 112, respectively, according to the following equations, $$\beta_{k1}(z, t) = \frac{4\pi\eta n_2}{\lambda}\delta[I_1(z, t) + 2I_2(z, t)] \quad (1)$$

$$\beta_{k2}(z, t) = \frac{4\pi\eta n_2}{\lambda}\delta[I_2(z, t) + 2I_1(z, t)] \quad (2)$$

where the above formulas reflect the fact that the intensities and therefore the propagation constants may vary with position around the fiber loop and in the case of source light with amplitude modulation, may vary in time. The variable z represents the position along the length of the loop, with z=0 defined by where the cw wave enters the loop at the output of coupler 106 and z=L being similarly defined where the ccw wave enters the loop of length L.

In the above equation, the wavelength of light is given by $\lambda$, the impedance of the coil medium by $\eta$, the Kerr coefficient of the coil fiber by $n_2$, and $\delta$ represents a constant factor related to the distribution of light across the fiber cross-section. As can be seen from the above formulas, if $I_1$ and $I_2$ are not equal at a given point in the loop at a given time, $\beta_{K1}$ and $\beta_{K2}$ will be different at that point in the fiber at that instant. The source light may have amplitude modulation imposed upon it that will cause $I_1(t,z)$ and $I_2(t,z)$ to vary in time. Also, $I_1(t,z=0) \neq I_2(t, z=L)$, then the light waves entering the loop have unequal amplitudes, which causes differences between $\beta_{K1}$ and $\beta_{K2}$.

It should be noted that, in equation 1, that $\beta_{K1}$ is dependent on its own intensity $I_1(t,z)$ and twice as dependent on the intensity $I_2(t,z)$ of the oppositely propagating wave. That is, the dependence of $\beta_{K1}$ on the oppositely propagating wave, i.e., the cross effect, is twice as strong as the dependence on its own intensity, i.e., the self effect. This is similarly true for $\beta_{K2}$. If, instead, the two dependencies were equal, then $\beta_{K1}$ would be equal to $\beta_{K2}$. Because of this relationship, an imbalance in $I_1$ and $I_2$ give rise to unequal optical phase shifts around the loop. Thus, each beam will travel an optical path that has a different length than the other. In such case, beams 111 and 112 leave loop 104 out of phase with respect to each other despite the non-rotation of loop 104. If beams 111 and 112 are in phase, there is a constructive interference which results in a maximum type of light signal being presented to detector 124 which has corresponding electrical signal 126 indicating beams 111 and 112 to be in phase and, consequently, indicating the non-rotation of loop 104. However, when beams 111 and 112 have differing intensities, which are out of phase, electrical signal 126 from detector 124 falsely indicates rotation of loop 104 when loop 104 is actually at rest. This false indication is an error due to an optical Kerr effect, which is caused by the index of an optical medium not being completely independent of the intensity of a traversing beam in the medium. This false indication of rotation $\Omega_e$ is given by the following, $$\Omega_e = \frac{2c}{D}\eta n_2 \delta(1-2U)\left[\frac{\langle I_o^2(t)\rangle - 2\langle I_o(t)\rangle^2}{\langle I_o(t)\rangle}\right] \quad (3)$$

where D is the sensing coil diameter, $I_o(t)$ is the source intensity at the time t of being split into $I_1$ and $I_2$ and entering the sensing coil, c is the speed of light in a vacuum and U is the split ratio of the loop coupler, i.e., $I_2=UI_o$ and $I_1=(1-U)I_o$. The brackets < > indicate the time average of the enclosed quantity, which may in general be time dependent. For the case of a monochromatic source with constant intensity $\langle I_o^2(t)\rangle = \langle I_o(t)\rangle^2$ making the term in brackets [ ] equal to $-\langle I_o\rangle$ and providing for an error if $U \neq 0.5$. In this case, the situation employs the use of square wave modulation of the source light wave intensity $I_O$ with a 50 percent on/off duty cycle to eliminate this effect. This makes $\langle I_o^2(t)\rangle = 2\langle I_o(t)\rangle^2$ and thus, the term in brackets [ ] in equation 3 equal to zero. This elimination of the Kerr effect for all values of U is accomplished. This is accomplished by essentially halving the size of the cross effect in equations 1 and 2 since the two optical waves only overlap half the time, whereas the self effect is always present. In this implementation, the modulation frequency $f_g$ must be above the inverse of the coil transit time $\tau$, and is typically a factor of ten above $1/\tau$ to achieve most of the benefit of this error reduction technique. Different light sources can have different relationships between $\langle I_o^2(t)\rangle$ and $\langle I_o(t)\rangle^2$. Broadband sources such as super luminescent diodes were originally pursued for interferometric fiber optic gyroscope applications as a means of eliminating drift due to light back scatter in the sensing loop and due to the propagation of light in the unwanted second state of polarization in the sensing loop. In the case of broad band sources, the relationship of $\langle I_o^2(t)\rangle$ to $2\langle I_o(t)\rangle^2$ depends on how the source is energized and can be different than the case of a monochromatic source of constant amplitude. These differences are due to intensity fluctuations resulting from the instantaneous beating of independent oscillators that comprise a broad spectral source. Thus, depending on the specific broad band source and method of excitation, the Kerr effect will be different for a gyro using a broad band source. One solution is to assure that the Kerr effect is zero by making the intensity levels of beams 111 and 112 effectively equal to each other. It is possible to simplify equation 3 by representing $\Omega_e$ as $$\Omega_e = k_1(1-2U)\langle I_o(t)\rangle = k_1(1-2U)I_o(t) \quad (4)$$

where $$k_1 = \frac{2c}{D}\eta n_2 \delta \left[ \frac{\langle I_o^2(t)\rangle - 2\langle I_o(t)\rangle^2}{\langle I_o(t)\rangle^2} \right] \quad (5)$$

and where the < > in equation 4 was dropped and from here on $I_o(t)$ refers to only the average value of $I_o(t)$. However the average value of $I_o(t)$ is considered here to vary slowly, but in a time frame much longer than τ. Thus, the [ ] in equation 3 was intended average over times substantially longer than τ.

Equation 5 may be rewritten as $$k_1 = \frac{2c}{D}\eta n_2 \delta \left( \frac{1}{\varepsilon} - 2 \right) \quad (6)$$

where ε is now defined as the effective duty cycle given by, $$\varepsilon = \frac{\langle I_o \rangle^2}{\langle I_o^2 \rangle} \quad (7)$$

In the above equation 5, it was assumed that fiber coil 104 was loss-less. In the case of a uniform loss per unit length, α, along the fiber coil 104 length, equation 4 would be modified to be $$\Omega_e = k_1(1-2U)\left( \frac{I_i - I_o}{\ln I_i - \ln I_o} \right) \quad (8)$$

where $I_i$ and $I_o$, respectively, are the optical intensity of the light incident on loop splitter 106 and the optical intensity of the light exiting fiber coil 104 after recombination at loop splitter 106. For this case of a coil with optical loss but a loss-less splitter, the ratio of $I_o$ to $I_i$ is given by $$\frac{I_o}{I_i} = e^{-2\alpha L} \quad (9)$$

Output signal 126 from photo-detector/preamp combination 124 is then given by $$V_{126} = k\{1 + \cos[\phi_R + \phi_e + \phi_m \cos(\omega_g t + \Theta)]\} \quad (10)$$

where $$\phi_e = \Omega_e \left( \frac{2\pi L D}{\lambda c} \right) \quad (11)$$

where L is sensing loop length 104 and D is the diameter of the sensing loop 104, and k is a constant that includes the light source 102 intensity $I_O$, the photo-detector 124 gain, and the losses of the optical circuit.

Phase signal demodulator 128 receives signal 126 and demodulates that signal with respect to a reference signal from oscillator or phase modulator 118 at frequency $f_g$. An output signal 132 of demodulator 128

$$V_{132} = k'J_1(\phi_m)\sin(\phi_R + \phi_e) \quad (12)$$

goes to phase signal servo electronics 135, where k' is a constant that includes k and the demodulator gain.

In order to achieve the required output linearity at rotation rates further from zero, i.e., use the linear portion of the sine function in equation 12, the gyroscope is operated in a closed loop manner. Signal 132 is used to represent the servo error signal being indicative of a phase difference between waves 111 and 112. Upon acceptance of signal 132 phase signal servo electronics 135 generates a voltage 133 of a single or dual ramp type in accordance with modulation that is summed with the bias modulation from generator 118 in amplifier 148. The output signal 133 containing voltage ramp signal is then supplied to optical phase modulator 116 that produces a suitable phase ramp in the sensing loop. The voltage ramp may be of a staircase ramp with a reset which is known as the "digital phase step" method, a sawtooth ramp with resets which is known as the "serrodyne technique", or of a triangular wave shape known as the "dual ramp" technique. In any case, this phase ramp produces another optical phase difference $\phi_f$ between waves 111 and 112 in order to restore $V_{132}$ to its null condition. The phase ramp signal 133 will contain within it the information related to the magnitude and direction of rotation rate. Signal 133 is therefore supplied to rotation rate indicator 131 to extract the rotation information and output the result. Under closed loop operation, the new form of signal 132 is given by $$V'_{132} = k'J_1(\phi_m)\sin(\phi_R + \phi_e + \phi_f) \quad (13)$$

where $\phi_R$, $\phi_e$, and $\phi_f$ are optical pease differences due to rotation, the Kerr effect, and the applied phase ramp, respectively.

Figure 4:
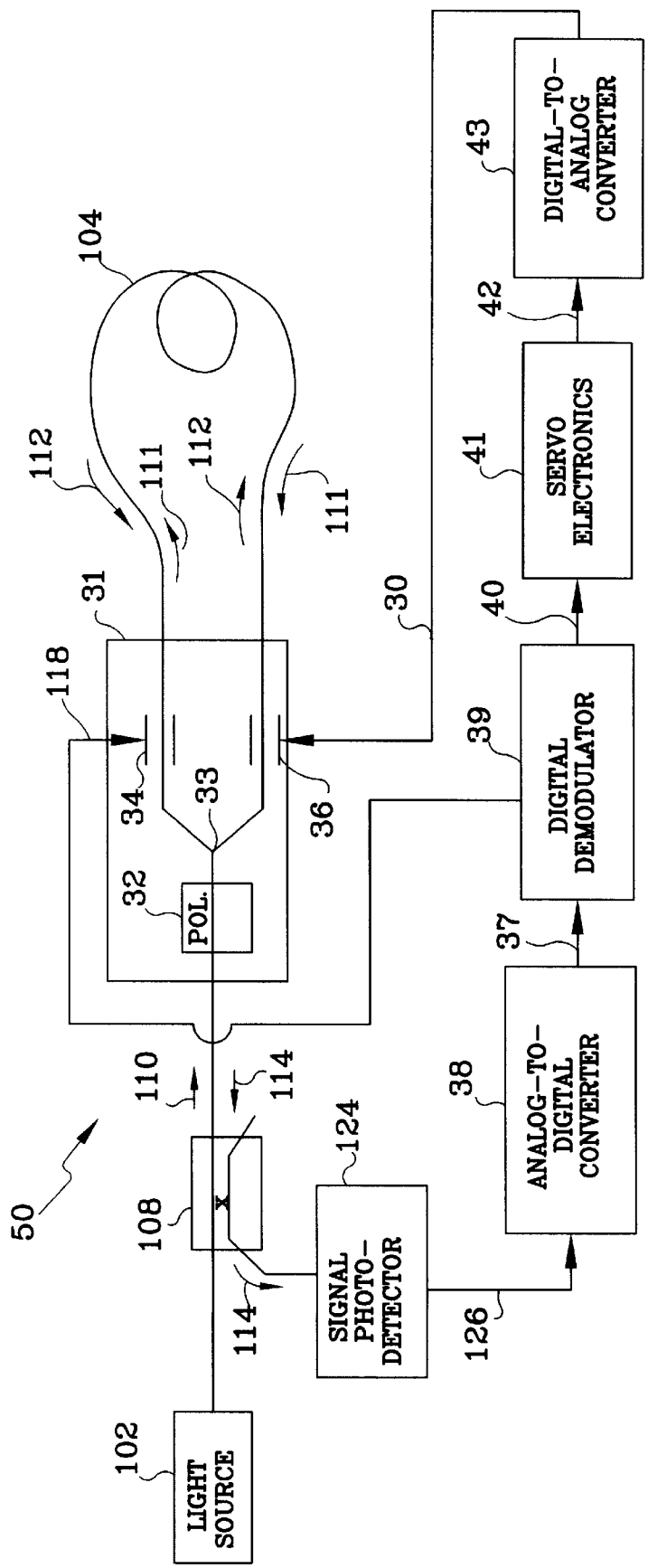
FIG. 4 shows a closed loop interferometer fiber optic gyroscope of the related art, having an integrated optic circuit.

A preferred architecture 50 for realizing a low drift closed-loop IFOG is shown in FIG. 4. In this architecture, a multi-function integrated optical chip 31 is used, wherein a polarizer 32, a Y-junction optical power splitter 33, and electro-optic phase modulators 34 and 36 are located. Y-junction splitter 33 serves to split light wave 110 into cw and ccw waves 111 and 112, respectively, before traversing coil 104 and then recombines waves 111 and 112 into light wave 114, after traversing fiber coil 104. Phase differences due to rotation of loop 104, occur in waves 111 and 112, which interfere when combined as wave 114. The intensity of wave 114 indicates an amount of interference between waves 111 and 112 and thus the amount of rotation of loop 104. However, another cause (besides rotation and the Sagnac effect) of phase shift between waves 111 and 112 is Kerr effect. Light wave 114 is converted to an electrical signal 126, which is representative of wave 114. Electrical signal 126 is converted to a digital signal 37 by an analog-to-digital converter 38. Signal 37 is demodulated by digital demodulator 39, which has a bias modulator. Demodulator 39 outputs a bias modulation signal 118 to phase modulator 34. Demodulated signal 40 goes to servo electronics 41. The servo electronics 41 digital phase-nulling signal 42 goes to a digital-to-analog converter 43. An analog-nulling signal 30 from converter 43 goes to phase modulator 36 to null the phase difference between counter-propagating waves 111 and 112.

If the split ratio of slitter 33 is not fifty percent, then (1−2U) will be non-zero, resulting in a Kerr effect bias, $\Omega_e$. The present fiber optic gyroscope 50 has a mechanism for compensation of this Kerr effect bias due to, in general, unequal light power of waves 111 and 112 incident to coil 104 in cw and ccw directions. These compensation methods vary depending on expected variations over the gyroscope mission life. The possible variational situations that affect the Kerr effect and the method of compensation, are temperature changes, source power variations over time, and coil 104 loss variations over time and temperature. In the latter case, a coil loss variation over time may occur in a space environment because of exposure to radiation. Radiation environments can cause the coil fiber to "darken"; thus increasing its loss over time as the cumulative dose grows.

In the arrangement of FIG. 4 sinusoidal modulation and demodulation may be used as previously described; however, a square wave modulation coupled with digital demodulation, is more desirable. This later technique is a low drift signal processing scheme that uses digital electronics as shown to the fullest extent possible. The electronics therefore gave more reproducible results at a lower cost.

Figure 5:
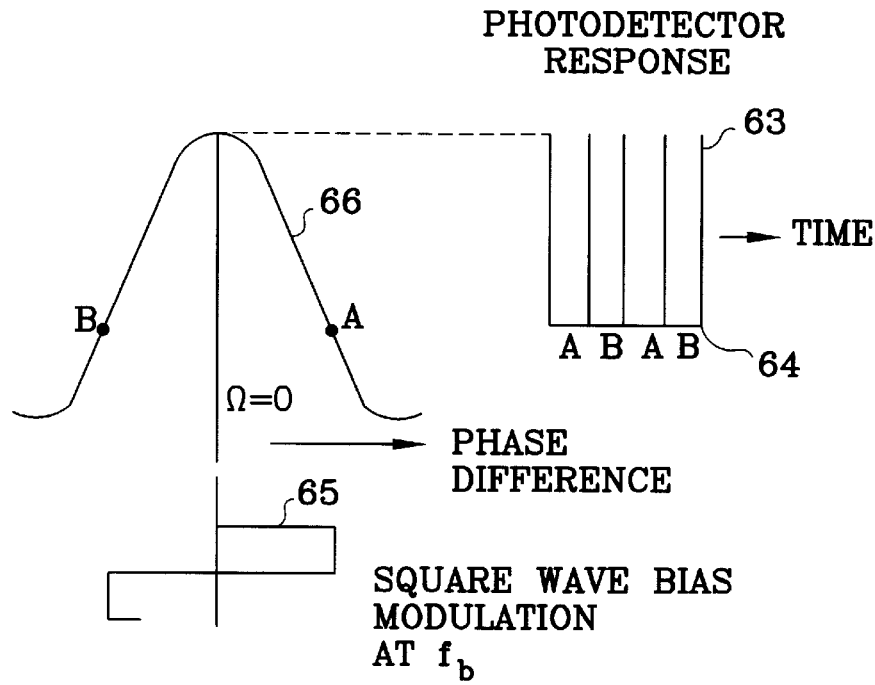
FIGS. 5, 6 and 7 are graphs showing the relationships of bias modulation, the cosine function and photo-detector signals.
Figure 6:
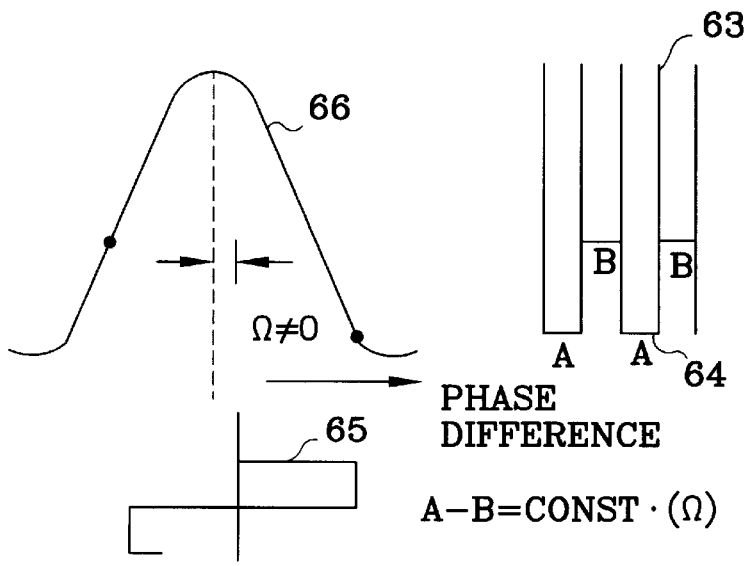

The operation of the front-end signal processing electronics, namely the modulation process and digital demodulation is first illustrated for the open loop case of FIG. 4; that is if the output of the digital demodulator were disconnected from the servo electronics. FIGS. 5 and 6 show the output current of the signal photo detector versus the phase difference between waves for the case of square wave modulation. FIG. 5 shows the case for $\Omega=0$ and FIG. 6 shows the case for $\Omega \ne 0$. Here, in practice, square wave modulation 65 produces modulation transients 63 by the value of switching $\Delta\phi$ from point A during the first half cycle of modulation to point B on the raised cosine function 66 shown on the left side of each figure. These are shown by the vertical lines in the resultant modulated photo detector current vs. time, which is proportional to the optical intensity impinging on the photo detector for an ideal photo detector. Again, in the absence of rotation, the output 64 at points A and B are equal, while the presence of rotation makes the output unequal for the "A" half periods and "B" half periods.

Figure 7:
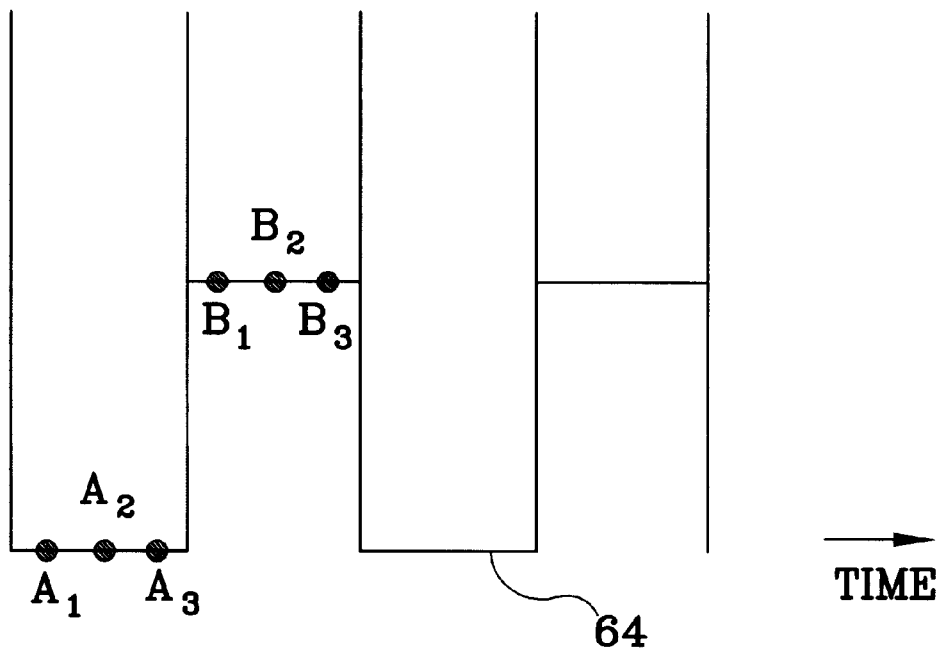
Figure 7:
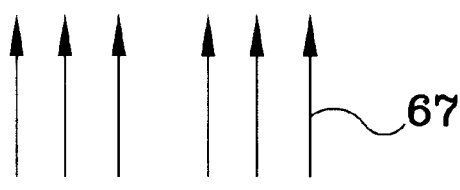

One method of recovering the rotation rate, shown in FIG. 7, is that of a digital demodulation scheme where the output of the photo detector in a square wave modulated system is sampled at points $A_i$ during the first half cycle and points $B_i$ during the second half cycle. The sample event is represented by an arrow. Each sample 67 is converted from an analog signal to a digital one and the difference between the digital sum of the $A_i$'s and the digital sum of the $B_i$'s is proportional to $\Omega$.

The demodulator output is an odd function having a large rate of change at zero phase shift, and thus changes algebraic sign on either side of zero phase shift. Hence, digital demodulator signal can provide an indication of which direction a rotation is occurring about the axis of the coil, and can provide the large rate of change of signal value as a function of the rotation rate near a zero rotation rate, i.e., the detector has a high sensitivity for phase shifts near zero so that it, output signal is quite sensitive to low rotation rates.

During closed loop operation, as depicted in FIG. 4, the output of a digital demodulator 39 serves as the error signal in a feedback loop. That is, in the presence of rotation the output of the digital demodulator drives the feedback loop to impact an optical phase shift between cw and ccw waves that is equal and opposite to the sum of the phase shift $\phi_e$ imposed by rotation rate plus the phase shift $\phi_e$ imposed by the optical Kerr effect. This phase shift impacted between cw and ccw waves by the feedback loop is denoted by $\phi_f$ where, $$\phi_f=-(\phi_R+\phi_e)\pm m\pi \text{ (m is an integer)} \quad (14)$$

The current on a photo detector 124 during closed loop operation for a square wave phase modulation amplitude of $\pm\phi_m$ is given by $$i_A=\tfrac{1}{2}I_D k_D[1+\cos(\phi_R+\phi_e+\phi_f)\cos\phi_m-\sin(\phi_R+\phi_e+\phi_f)\sin\phi_m] \quad (15)$$

for the first half period of the modulation cycle and by $$i_B=\tfrac{1}{2}I_D k_D[1+\cos(\phi_R+\phi_e+\phi_f)\cos\phi_m-\sin(\phi_R+\phi_e+\phi_f)\sin\phi_m] \quad (16)$$

for the second half period of the modulation cycle. In the above equations, $I_D$ is the light intensity at the signal photo detector, and $k_D$ is the signal photo detector efficiency. The output of the digital demodulator is a digital signal of amplitude proportional to $$I_D k_D \sin(\phi_R+\phi_e+\phi_f)\sin(\phi_m). \quad (17)$$

Note that if not for operation of the feedback loop driving $\phi_f$ to $-(\phi_e+\phi_R)$ the digital demodulator output follows a sine function. This case of $\phi_f=0$ (no feedback) results in an output that at rotation rates further from zero, is less and less linear. The output does not become linear again until large enough rotation rates are encountered that give optical phase difference shifts of. $\phi_R=\pm m\pi$, where m is an integer. In fact, the output of demodulator 39 is zero at $\phi_R=0$ or $\phi_R=\pm m\pi$ and linear in regions close to these values. There is a strong desire to operate the gyroscope at a null, thereby gaining a gyroscope scale factor that is independent of the output signal size, gains of the electronics and having phase sensitive demodulator 39 stay within its linear operation region near its null condition.

This is accomplished in the arrangement of FIG. 4 adding a further phase modulator 36, or frequency shifter, near the end of the coil 104 in an optical path portion used by the opposite direction traveling electromagnetic waves propagating through the coiled optical fiber 104 to reach the photo detector 124. This phase modulator 36, or frequency shifter, is operated in a feedback loop from the photo detector system 124, i.e., the so-called rate loop, and provides sufficient negative feedback such that phase modulator 36 introduced phase change $\phi_f$ is just enough to cancel the net phase shift difference between the opposite traveling direction electromagnetic waves resulting from a rotation about the axis of the coiled optical fiber 104 and from the optical Kerr effect.

As a result of the servo loop, there will be little net average phase shift $\phi_N=\phi_f+\phi_R+\phi_e$ from $0\pm m90$ occurring at photo detector 124 except for transient rotation rate changes, and so little net average phase shift sensed by digital demodulator. Thus, the DC-averaged output signal of this digital demodulator 39 will always be near to, or at, zero. This is true, because the feedback gain of a typical servo loop is extremely high near frequencies close to zero. The signal from servo electronics 41 and D/A 43 converter connected to digital demodulator 39 for operating this additional phase modulator 36, through providing a signal directing the modulator to provide a particular phase shift sufficient to cancel the phase shift due to rotation or make $\phi_f=-(\phi_R+\phi_e)\pm m\pi$ will thus contain within it or a related signal the information as to the magnitude and direction of the rotation rate and the value of m.

Several forms for the output signal from the servo electronics 41 and D/A converter 43 connected to digital demodulator 39 in the rate feedback loop have been suggested for operating this additional optical phase modulator 36. One common and good choice is to use a serrodyne generator, which applies a sawtooth-like signal to optical phase modulator 36. A sawtooth or saw-tooth-like signal is chosen because it can be shown that an ideal sawtooth signal of $2\pi$ phase amplitude provides what amounts to a pure frequency translation for the modulated electromagnetic waves, a single-sideband modulator. As a result, light passing through the phase modulator being operated with such a sawtooth signal will leave modulator 36 with its frequency translated by an amount equal to the frequency of the sawtooth signal. A non-ideal sawtooth signal will not result in pure frequency translation, there instead will be added harmonics generated which can be kept small by providing very nearly an ideal sawtooth waveform of 2π amplitude and by careful design of the modulator.

Another type of modulation waveform is called a dual ramp waveform that consists of a linear ramp of positive slope followed by a ramp of negative slope. In this case, the feedback loop alternately locks to $\phi_N=-\pi$ and $\phi_N=+\pi$ or more generally to $\phi_N=m\pi$ and $\phi_N=(m+2)\pi$. In the absence of rotation, the slope magnitudes of the up-ramp and the down-ramp are equal. In she presence of rotation, the slope magnitudes are different with the magnitude of the difference in slopes between the two ramps being proportional to the rotation rate magnitude. Which ramp, the up-ramp or the down-ramp, has the greater slope magnitude is an indication of rotational directions. This technique has the performance advantage that there is no fast fly-back required in the phase shifter voltage as is the case with the serrodyne waveform.

As an additional note, it is recognized that the bias modulation and the feedback ramp may be added together and applied to a single or multiple phase modulators.

A result of the closed loop system shown in FIG. 4 is that the servo electronics synthesize the phase ramp necessary to produce the phase shift $\phi_f$. In doing so, a digital signal is developed in the servo electronics indicative of the sign and magnitude of $\phi_f$ and therefore indicative of $\phi_R+\phi_e$. This digital signal serves as the gyro output. It may be a parallel digital signal or a serial digital signal. It may also be a series of pulses proportional in pulse frequency to the angle turned over an increment of time. In all cases, the desired signal is proportional to $\phi_R$ alone.

However, the object of this invention is to compensate for the presence of $\phi_e$ in the raw gyro output signal as shown in FIG. 4. A processor is employed to compensate the raw gyro output signal to remove the effects of the Kerr effect from the gyro output. These compensation methods are described in the following description.

Thus, the output of the gyro in FIG. 4 is a digital output proportional to the sum of the phase shifts $\phi_R$ and $\phi_e$ between cw and ccw waves due to initial rotation and Kerr effect, respectively. The phase shift due to Kerr effect is given by $$\phi_e = k_1 \frac{2\pi LD}{\lambda c}(1-2U)\left(\frac{I_i - I_o}{\ln I_i - \ln I_o}\right) \quad (18)$$

where $$k_1 = \frac{2c}{D}\eta n_2 \delta\left[\frac{\langle I_o^2(t)\rangle - 2\langle I_o(t)\rangle^2}{I_o(t)}\right)^2\right] \quad (19)$$

where the various averaging times have been defined earlier.

Figure 8:
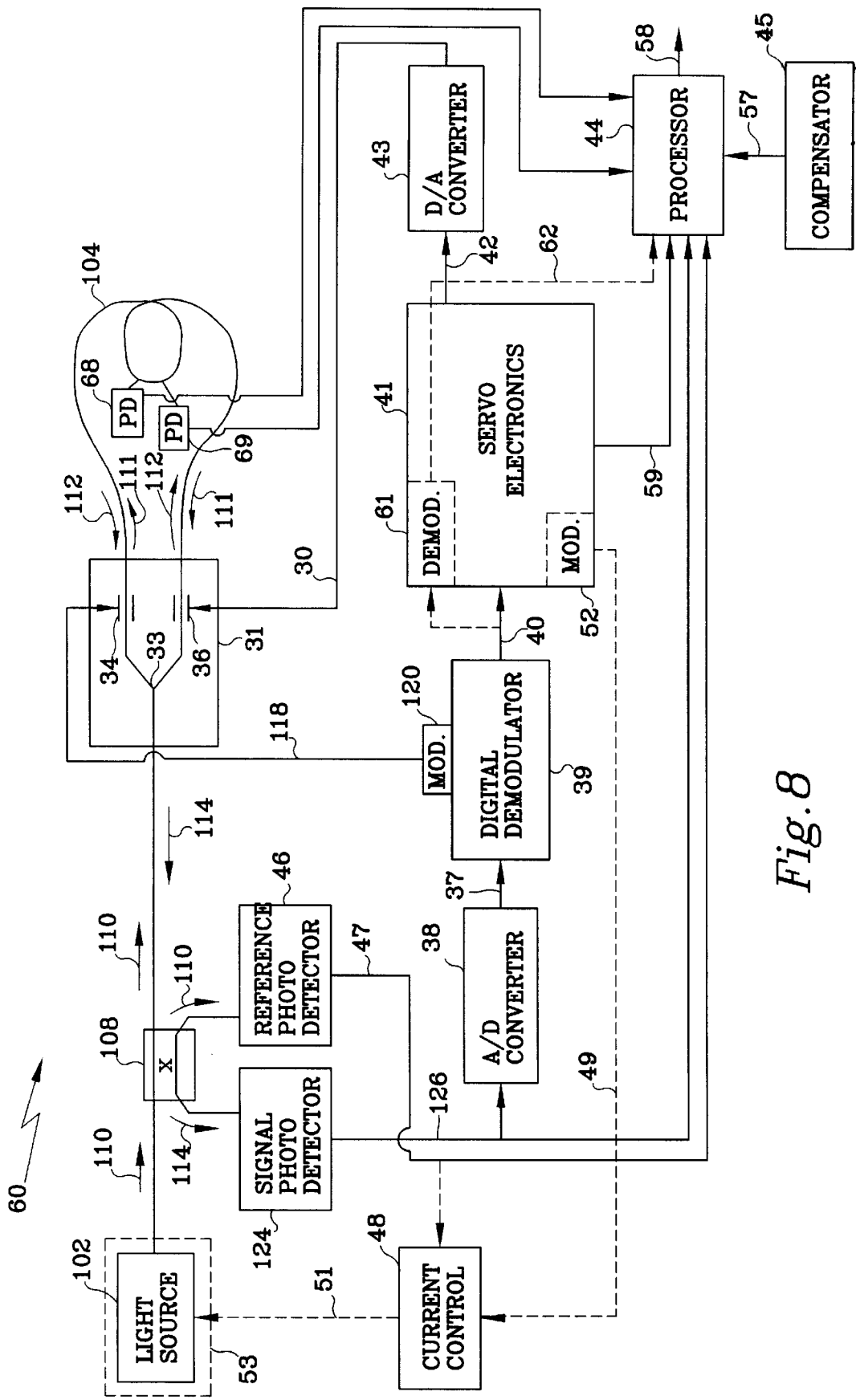
FIG. 8 reveals a closed loop interferometer fiber optic gyroscope incorporating the Kerr bias compensation configuration.

FIG. 8 shows a gyroscope 60 compensated for Kerr effect in accordance with the present invention. One case is a light source 102 having constant statistics. The split ratio of splitter 33 is repeatable over temperature. The source 102 power is constant and stable components are used. Loss of coil 104 and associated optical components such as splitter 33, coupler 108, connecting fiber, and detector 124 do not change with time in this case. A thermally based broad band light source 102 results in zero Kerr effect for gyroscope 60. Light sources other than thermal sources excited continuously or at around a 50 percent duty cycle, are dealt with here. Unmodulated but self-pulsing light sources can cause Kerr effect bias. Monochromatic or quasi-monochromatic modulated sources can cause Kerr effect bias.

Source 102 that has a waveform factor value of $$\frac{\langle I_o^2(t)\rangle}{\langle I_o(t)\rangle^2} = 2 \text{ is typically appropriate for Kerr effect}$$

compensation and is sort of a definition of a broad band light, if continuous. $I_o(t)$ is the intensity of the modulated source 102 wave as a function of time. The waveform factor would be expected to be very close to 2 for inertial navigation accuracies of 0.001 degree per hour drift. As an example, a modulated source that clearly does not meet these characteristics could have a duty cycle of less than ⅝. One duty cycle of interest here is 75 percent.

To provide a characterization of a look-up table of information for compensator 45 to be fed to processor 44 which minimizes the effect of Kerr bias, Kerr bias versus temperature data are obtained through various measurements.

Figure 9:
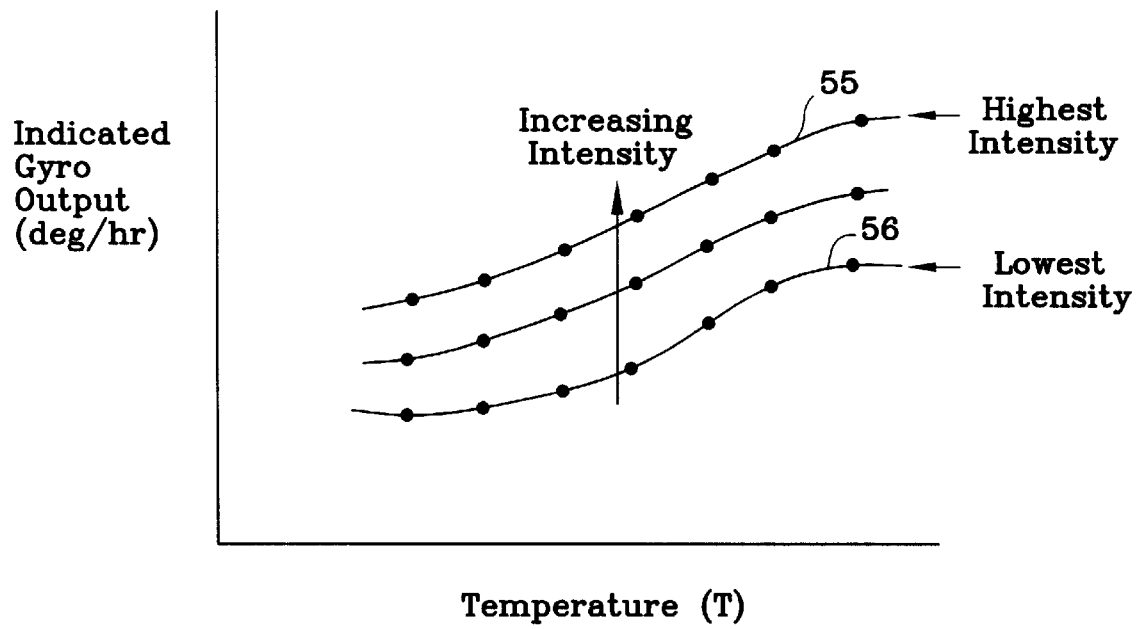
FIG. 9 is a graph of indicated gyroscope output versus temperature for several source intensities.

If there are no other significant errors in the gyro, simply measuring its output over temperature T while the gyro is not rotating gives a measure of $\phi_e(T)$ that may be subtracted from the observed $\phi_f(T)$ during subsequent operation. In the embodiment shown in FIG. 8, the calibration data is embedded in the compensator and a processor is used to read the gyro output and its temperature (through a temperature sensor) and compensate its output by subtracting out its expected Kerr effect at a given temperature. If other errors exist in the gyro besides Kerr effect, the Kerr effect error component may be identified and measured in the calibration procedure by comparing the output of the gyro at various temperatures for two or more different source intensity magnitudes or by comparing the gyro output for various temperatures for the cases of using source current modulation versus no source current modulation. Both of these vary the Kerr effect so that it can be distinguished from other errors. In the latter case, shown in FIG. 8, a high speed source current modulation is used to purposely change the source statistics represented by the term in [ ] in equation 19. By comparing the gyro output during calibration with this external modulation versus the case of no modulation or by varying the characteristics of the external modulation, the Kerr effect error may be identified and stored in the memory of the compensator for compensation during operation. In the latter case, at least two different duty cycles of modulation of light source 102 or at two different power levels of source 102. The result is at least two data plots or curves 55 and 56 as shown in FIG. 9. One curve plus a variation for source intensity would be plotted in the special case when both splitter 33 ratio and coil 104 loss are constant versus temperature.

In the above compensation scheme, the average light source intensity is assumed to be sufficiently stable over the storage life and operating life of the instrument such that Kerr effect changes are negligible compared to the desired performance. This may be accomplished by choosing a sufficiently long-life broad band light source or by actively servoing the source current to adjust the source output to obtain a constant average source intensity. One method of doing this active scheme is shown in FIG. 8 by the dashed lines. Here, an extra photo detector, a ref PD 46, is employed at the unused port of the fiber optic coupler. The ref PD is used to sense the light source intensity and its output, after low pass filtering to obtain its average value, is used to control the source current. This effects source intensity control to give a stable intensity output over time.

In the above case, source 102 has imperfect light statistics and Kerr effect exists causing rotation output error. The other error sources which Kerr effect can be distinguished from are those of polarization, second harmonics, pickup, magnetic field and so forth, because a change in a modulation 49 duty cycle or source 102 power, affects the Kerr effect bias and rot the other error sources.

A second scheme for compensating the Kerr effect error, shown in FIG. 8, does not rely on the long-term stability or repeatability of the light source average intensity. It measures the light source average intensity (denoted as $I_o$ for averaging times of typically longer than 10 ms) continuously during operation and corrects for intensity changes in the calculation of the Kerr effect error, $\phi_e(T)$. The value of $\phi_e(T)$ is then used to compensate the raw rotation rate output for the Kerr effect error. The result is an accurately estimated Kerr effect error that is eliminated to yield the true rotation rate.

In order to use the arrangement of FIG. 8, the Kerr effect error must be measured both over temperature and as a function the average light intensity, $I_o$. Again, varying the intensity $I_o$ during the initial calibration procedure distinguishes the Kerr effect error from other errors. This calibration procedure may resemble the curves in FIG. 9, where, at each temperature (or even just some temperatures) the intensity is varied and the gyro output is recorded. The gyro is not rotated in order to distinguish between Kerr effect error and rotation error during the calibration procedure. The information from FIG. 9, namely the dependence of the Kerr error on T and average intensity $I_o$, is recorded into the compensator. During operation, the temperature of the gyro is measured as well as the light source intensity. The raw rotation rate output of the gyro is then compensated by the process to provide a rotation rate output that is free of Kerr effect errors.

Again, in the above case, if there are other errors that also depend on $I_o$ and T, the Kerr effect error may be isolated during the calibration procedure by employing a source modulation as shown in FIG. 8. This device changes the statistics of the source so as to intentionally vary the Kerr effect. If the source is already a modulated or pulsed source, the modulation of pulse rate may be varied or the source may be changed from its initial modulated state to continuous operation. In this way, an accurate measure of the Kerr effect error may be ascertained during calibration.

A more sophisticated method of. compensating the Kerr effect error is also shown in FIG. 8. This method assumes that the dependence of the split ratio U(T) on temperature T is a repeatable function over time. It compensates for average source intensity changes over time. It also compensates for coil loss changes over time as long as these loss changes are uniformly distributed over the fiber length L. This is represented by the coil loss per meter, $\alpha$, changing over time. The functional dependence of the Kerr effect error versus coil loss is shown in equation 18. To account for both coil loss variations source intensity variations the light power incident on the ref PD is measured as an indication of the light intensity incident on the loop splitter $I_i$. The average light power incident on the signal PD is representative of $I_D$, the light intensity exiting the coil. By low pass filtering or averaging both signals at the outputs of the Ref PD and Signal PD, signals proportional to $I_i$ and $I_D$ are obtained. By measuring temperature also, the Kerr effect bias can be estimated during the gyro operation over temperature. It also addresses compensation for changing source power and coil loss.

In the calibration process of using the above arrangement, it is again important to vary the source intensity (similar to that in FIG. 9) and perhaps the source statistics (duty cycle) to accurately measure Kerr effect errors. The model for the Kerr effect error can then be loaded into memory for compensation of Kerr effect errors during operation.

It must be recognized that with the arrangements of FIG. 8 that the processor and the compensator may be integrated with the digital demodulator, and the servo electronics onto a single digital circuit chip.

As a further note, it is possible to actually account for changes of the split ratio over temperature and over time. This may be done for instance, by employing photodetectors (PD) 68 and 69, as shown in FIG. 8 in the coil region. By tapping light from the coil 104 with photodetectors 68 and 69, one can directly observe the split ratio over temperature and time, and also deduce the coil loss over temperature and time. By using a compensation model that includes split ratio and coil loss and by monitoring these two parameters during operation, the Kerr effect can be effectively compensated.

As a further possiblity without the coil-region photodetectors, the coil loss and the splitter split ratio may be directly measured prior to the final gyro assembly.

Again, compensation is provided to processor 44 by compensator 45. The change of split ratio of splitter 33 over temperature is compensated for with a look-up table in compensator 45. The loss of coil 104, which changes of temperature, is similarly compensated for. Intensity $I_O$ of light source 102 is compensated with a characterization relative to time. Signal 126 intensity from signal photo detector 124 provides information such as about power levels after light 110 goes through coil 104, and/or source power changes. Light signal 110 goes to reference photo detector 46, which converts signal 110 into a representative electrical signal 47, and provides an indication of source 102 power.

In all the above discussions, it is understood that the light source itself may be thermally stabilized or may be compensated for changes over temperature. In the latter case, source 102 would be put in a temperature-controlled package 53 and thus remove the issue of source 102 power variation over temperature.

The aforementioned source 102 power control is effected through a current control device 48 which receives a signal 47 from reference photo detector 46. Signal 46 provides a reference that keeps source 102 at a constant level. Also, a modulation signal 49 from modulation signal generator 52 in servo electronics 41 goes to current control 48. This signal is for modulating light source 102 intensity. This modulation 49 is synchronized with bias modulation 118 to modulator 34 so as to momentarily turn off light source 102 during the fly-back time of bias modulation signal 118 because of the glitches in the light 114 received at signal photo detector 124. These glitches are the ultimate consequence of signal 118 flyback. Turning light source 102 off during each of these glitches removes them from light signal 114 at detector 124. Modulation signal 49 may be at a frequency that is the same as a multiple or a fraction of bias modulation signal 118. They are synchronized so that many or all of the glitches or spikes in light signal 114 can be blanked out, eliminated or at least significantly reduced. Signals 47 and 49 are implemented by current control device 48 with an appropriate control signal 51 to light source 102.

Attenuation of light waves 111 and 112 propagating in coil 104, which has the most significant length of the optical circuit, may change with time due to aging or cumulative darkening of coil 104 with radiation. IOC. 31 and coupler 108 loss would likely be not as significant as that of coil 104. Coil loss typically increases, rather than decreases, with time. Also, attenuation of light waves 111 and 112 in coil 104 may vary with temperature.

As noted above, characterization of source 102 intensity changes relative to time, of coil 104 loss relative to temperature and time, and of splitter 33 ratio relative to temperature can be algorithmically and/or by look-up table inserted into compensator 45 which feeds compensation data 57 into processor 44 for eliminating effects of Kerr bias on output 58 of processor 44. Source intensity versus temperature may he incorporated but it is left out here as source 102 temperature is controlled. Raw rate output 59 goes from servo electronics 41 to processor 44 which outputs corrected or compensated rotation rate output 58. Signal 40 from digital demodulator 39 goes to demodulator 61 besides servo electronics 41. Demodulator 61 removes the effects of modulator 52 as demodulator 39 does for bias modulation signal generator 120. Output 62 of demodulator 61 goes to processor 44.

Another factor is when gyroscope 60 is put together, splitter 33 is tuned to a fifty percent ration as practicable as possible.

In summary, the present invention involves compensation of Kerr effect bias in interferometric fiber optic gyroscopes. This approach is for eliminating optical glitches in light signal 114 to detector 124 (in FIG. 5) and for compensation of Kerr effect bias when light source 102 characteristics are not consistent with zero Kerr effect operation. The present approach and apparatus relies on thermal repeatability of splitter 33 ratio in the fiber optic circuit of gyroscope 60. This approach monitors and accounts for light source 102 power variations and fiber optic coil 104 aging loss due particularly to radiation in coil 104. The Kerr bias of gyroscope 60 is checked and characterized over temperature. As the bias is measured at each temperature, the light source 102 average power is varied and the bias sensitivity to source 102 power is calibrated at each temperature increment. The DC light power of signal 114 to signal photo detector 124 and of light 110 to reference photo detector 46 are monitored during normal operation. If source 102 changes power, output 47 of reference photo detector 46 will change and processor 44 will account for and compensate for Kerr effect bias change due to a total power change. If the source 102 power does not change, then the Kerr effect bias is compensated for the repeatable splitter 33 ratio change over temperature. The signal photo detector 124 DC level of signal 126 is monitored and compared to the reference photo detector DC level of signal 47, so that one can deduce changes in coil 104 loss due to radiation or other causes. Thus, an analytical model may be made from the characterizations of these changes and entered into compensator 45, and gyroscope 60 output 59 be compensated by processor 44 in conjunction with inputs from compensator 45 for a corrected rotation rate output 58.

We claim:

1. A fiber optic gyroscope comprising:
 a light source having an output;
 a splitter having a first port coupled to the output of said light source, and having second and third ports;
 a fiber optic coil having first and second ends connected to the second and third ports, respectively, of said splitter;
 a first photo detector coupled to the first port of said splitter;
 a processor, connected to said first photo detector, having a rotation rate output; and
 a Kerr effect compensator connected to said processor.

2. The fiber optic gyroscope of claim 1, wherein:
 the rotation output has Kerr effect error;
 the Kerr effect error varies with temperature;
 said Kerr effect compensator has Kerr effect error dependence on temperature information;
 said processor processes Kerr effect error dependence on temperature information from said Kerr effect compensator, to reduce Kerr effect error in the rotation output.

3. The fiber optic gyroscope of claim 2, wherein:
 said splitter has a split ratio from the first port to the second and third ports, which varies relative to temperature;
 said Kerr effect compensator has split ratio dependence on temperature information;
 said processor processes split ratio dependence on temperature information from said Kerr effect compensator, to reduce Kerr effect error in the rotation output.

4. The fiber optic gyroscope of claim 2, wherein:
 said coil has a loss that varies relative to temperature;
 said Kerr effect compensator has Kerr effect coil loss dependence on temperature; and
 said processor processes coil loss dependence temperature information in view of a given temperature to reduce error in the rotation rate output.

5. The fiber optic gyroscope of claim 2, wherein:
 said light source has an output intensity that varies relative to time;
 said compensator has Kerr effect error dependence on source output intensity information;
 said compensator outputs the Kerr effect error dependence on source output intensity information to said processor; and
 said processor processes the Kerr effect error dependence on source output intensity information in view of source output intensity information, to reduce error in the rotation rate output.

6. The fiber optic gyroscope of claim 5, wherein:
 said coil has a loss that varies relative to time;
 said compensator has Kerr effect error dependence on coil loss information;
 said compensator outputs the Kerr effect error dependence on coil loss information to said processor; and
 said processor processes the Kerr effect error dependence on coil loss information in view of coil loss information, to reduce error in the rotation rate output.

7. The fiber optic gyroscope of claim 2, wherein:
 said coil has a loss that varies relative to time;
 said compensator has Kerr effect error dependence on coil loss information;
 said compensator outputs the Kerr effect error dependence on coil loss information to said processor; and
 said processor processes the Kerr effect error dependence on coil loss information in view of coil loss information, to reduce error in the rotation rate output.

8. The fiber optic gyroscope of claim 2, wherein said light source is maintained at a constant temperature.

9. The fiber optic gyroscope of claim 1, further comprising:
 a second photo detector coupled to the output of said light source;
 a current control device connected to said light source and to said second photo detector; and
 wherein said current control device maintains the source output intensity at a constant magnitude, as indicated by an output of said second photo detector.

10. The fiber optic gyroscope of claim 8, further comprising:
a second photo detector coupled to the output of said light source;
a current control device connected to said light source and to said second photo detector; and
wherein said current control device maintains the source output intensity at a constant magnitude, as indicated by an output of said second photo detector.

11. The fiber optic gyroscope of claim 10, wherein:
said second photo detector is connected to said processor; and
wherein from outputs of said first and second photo detectors, said processor determines coil loss.

12. The fiber optic gyroscope of claim 8, further comprising:
a second photo detector coupled to the output of said light source and to the input of said processor;
wherein from outputs of said first and second photo detectors, said processor determines coil loss and source intensity.

13. The fiber optic gyroscope of claim 11, further comprising:
a first phase modulator proximate to said splitter; and
a first modulation generator connected to said first phase modulator.

14. The fiber optic gyroscope of claim 13, further comprising;
a second modulation generator connected to said current control device; and
wherein said current control device modulates the source output intensity at a frequency of said second modulation generator.

15. The fiber optic gyroscope of claim 14, wherein:
said first photo detector will detect glitches caused by said first phase modulator; and
said current control device minimizes the source output intensity at times of the glitches.

16. The fiber optic gyroscope of claim 15, wherein the split ratio of said splitter is trimmed to 0.5 at a common temperature.

17. The fiber optic gyroscope of claim 16, wherein:
the split ratio varies relative to time;
said compensator has Kerr effect dependence on split ratio information; and
said processor processes the Kerr effect dependence on split ratio information to reduce error in the rotation rate output.

18. The fiber optic gyroscope of claim 2, wherein the split ratio of said splitter is trimmed to 0.5 at a common temperature.

19. The fiber optic gyroscope of claim 18, wherein:
the split ratio varies relative to time;
said compensator has Kerr effect dependence on split ratio information; and
said processor processes the Kerr effect dependence on split ratio information to reduce error in the rotation rate output.

20. The fiber optic gyroscope of claim 12, further comprising:
a first phase modulator proximate to said splitter; and
a first modulation generator connected to said first phase modulator.

21. The fiber optic gyroscope of claim 20, further comprising;
a current control device connected to said light source; and
a second modulation generator connected to said current control device; and
wherein said current control device modulates the source output intensity at a frequency of said second modulation generator.

22. The fiber optic gyroscope of claim 21, wherein:
said first photo detector will detect glitches caused by said first phase modulator; and
said current control device minimizes the source output intensity at times of the glitches.

23. The fiber optic gyroscope of claim 22, wherein the split ratio of said splitter is trimmed to 0.5 at a common temperature.

24. The fiber optic gyroscope of claim 2, wherein:
at least one coil monitor photo detector is coupled to said coil and to said processor;
said splitter has a split ratio from the first port to the second and third ports, which varies relative to temperature or time;
said processor determines the split ratio from an output of said at least one coil monitor photo detector;
said Kerr effect compensator has Kerr effect dependence on split ratio information; and
said processor processes Kerr effect dependence on split ratio information, to reduce Kerr effect error in the rotation output.

25. A fiber optic electric current sensor comprising:
a light source having an output;
a splitter having a first port coupled to the output of said light source, and having second and third ports;
a fiber optic coil having first and second ends connected to the second and third ports, respectively, of said splitter;
a first photo detector coupled to the first port of said splitter;
a processor, connected to said first photo detector, having an indicated electric current output; and
a Kerr effect compensator connected to said processor.

26. The fiber optic electric current sensor of claim 25, wherein:
the indicated electric current output has Kerr effect error;
the Kerr effect error varies with temperature;
said Kerr effect compensator has Kerr effect error dependence on temperature information; and
said processor processes Kerr effect error dependence on temperature information from said Kerr effect compensator, to reduce Kerr effect error in the indicated electric current output.

27. The fiber optic electric current sensor of claim 26, wherein:
said splitter has a split ratio from the first port to the second and third ports, which varies relative to temperature;
said Kerr effect compensator has split ratio dependence on temperature information; and
said processor processes split ratio dependence on temperature information from said Kerr effect compensator, to reduce Kerr effect error in the indicated electric current output.

28. The fiber optic electric current sensor of claim 26, wherein:
said coil has a loss that varies relative to temperature;
said Kerr effect compensator has Kerr effect coil loss dependence on temperature; and
said processor processes coil loss dependence temperature information in view of a given temperature to reduce error in the indicated electric current output.

29. The fiber optic electric current sensor of claim 26, wherein:
said light source has an output intensity that varies relative to time;
said compensator has Kerr effect error dependence on source output intensity information;
said compensator outputs the Kerr effect error dependence on source output intensity information to said processor; and
said processor processes the Kerr effect error dependence on source output intensity information in view of source output intensity information, to reduce error in the indicated electric current output.

30. The fiber optic electric current sensor of claim 29, wherein:
said coil has a loss that varies relative to time;
said compensator has Kerr effect error dependence on coil loss information;
said compensator outputs the Kerr effect error dependence on coil loss information to said processor; and
said processor processes the Kerr effect error dependence on coil loss information in view of coil loss information, to reduce error in the indicated electric current output.

31. The fiber optic electric current sensor of claim 26, wherein:
said coil has a loss that varies relative to time;
said compensator has Kerr effect error dependence on coil loss information;
said compensator outputs the Kerr effect error dependence on coil loss information to said processor; and
said processor processes the Kerr effect error dependence on coil loss information in view of coil loss information, to reduce errors in the indicated electric current output.

32. The fiber optic electric current sensor of claim 26, wherein said light source is maintained at a constant temperature.

33. The fiber optic electric current sensor of claim 25, further comprising:
a second photo detector coupled to the output of said light source;
a current control device connected to said light source and to said second photo detector; and
wherein said current control device maintains the source output intensity at a constant magnitude, as indicated by an output of said second photo detector.

34. The fiber optic electric current sensor of claim 32, further comprising:
a second photo detector coupled to the output of said light source;
a current control device connected to said light source and to said second photo detector; and
wherein said current control device maintains the source output intensity at a constant magnitude, as indicated by an output of said second photo detector.

35. The fiber optic electric current sensor of claim 34, wherein:
said second photo detector is connected to said processor; and
wherein from outputs of said first and second photo detectors, said processor determines coil loss.

36. The fiber optic electric current sensor of claim 32, further comprising:
a second photo detector coupled to the output of said light source and to the input of said processor; and
wherein from outputs of said first and second photo detectors, said processor determines coil loss and source intensity.

37. The fiber optic electric current sensor of claim 35, further comprising:
a first phase modulator proximate to said splitter; and
a first modulation generator connected to said first phase modulator.

38. The fiber optic electric current sensor of claim 37, further comprising;
a second modulation generator connected to said current control device; and
wherein said current control device modulates the source output intensity at a frequency of said second modulation generator.

39. The fiber optic electric current sensor of claim 38, wherein:
said first photo detector will detect glitches caused by said first phase modulator; and
said current control device minimizes the source output intensity at times of the glitches.

40. The fiber optic electric current sensor of claim 39, wherein the split ratio of said splitter is trimmed to 0.5 at a common temperature.

41. The fiber optic electric current sensor of claim 40, wherein:
the split ratio varies relative to time;
said compensator has Kerr effect dependence on split ratio information; and
said processor processes the Kerr effect dependence on split ratio information to reduce error in the indicated electric current output.

42. The fiber optic electric current sensor of claim 26, wherein the split ratio of said splitter is trimmed to 0.5 at a common temperature.

43. The fiber optic electric current sensor of claim 42, wherein:
the split ratio varies relative to time;
said compensator has Kerr effect dependence on split ratio information; and
said processor processes the Kerr effect dependence on split ratio information to reduce error in the indicated electric current output.

44. The fiber optic electric current sensor of claim 36, further comprising:
a first phase modulator proximate to said splitter; and
a first modulation generator connected to said first phase modulator.

45. The fiber optic electric current sensor of claim 44, further comprising;
a current control device connected to said light source; and
a second modulation generator connected to said current control device; and wherein said current control device modulates the source output intensity at a frequency of said second modulation generator.

46. The fiber optic electric current sensor of claim 45, wherein:

said first photo detector will detect glitches caused by said first phase modulator; and said current control device minimizes the source output intensity at times of the glitches.

47. The fiber optic electric current sensor of claim 46, wherein the split ratio of said splitter is trimmed to 0.5 at a common temperature.

48. The fiber optic electric current sensor of claim 26, wherein:

at least one coil monitor photo detector is coupled to said coil and to the input of said processor; and said splitter has a split ratio from the first port to the second and third ports, which varies relative to temperature or time; and said processor determines the split ratio from an output of said at least one coil monitor photo detector;

said Kerr effect compensator has Kerr effect dependence on split ratio information; and said processor processes Kerr effect dependence on split ratio information, to reduce Kerr effect error in the indicated electric current output.

49. The fiber optic gyroscope of claim 25, wherein:

said splitter has a split ratio from the first port to the second and third ports, which varies relative to temperature;

said coil has a loss that varies relative to temperature;

said compensator has split ratio versus temperature information and coil loss versus temperature information;

said compensator outputs the split ratio versus temperature and coil loss versus temperature information to said processor; and said processor processes the split ratio versus temperature and coil loss versus temperature information in view of a given temperature to reduce error in the rotation rate output.

* * * * *